United States Patent
Chen et al.

(10) Patent No.: US 9,819,458 B2
(45) Date of Patent: Nov. 14, 2017

(54) FEEDBACK BUNDLING FOR POWER-LIMITED DEVICES IN WIRELESS COMMUNICATIONS

(75) Inventors: Wanshi Chen, San Diego, CA (US); Juan Montojo, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1198 days.

(21) Appl. No.: 13/205,365

(22) Filed: Aug. 8, 2011

(65) Prior Publication Data

US 2012/0039227 A1    Feb. 16, 2012

Related U.S. Application Data

(60) Provisional application No. 61/373,773, filed on Aug. 13, 2010.

(51) Int. Cl.
  *G08C 17/00* (2006.01)
  *H04L 5/00* (2006.01)
  (Continued)

(52) U.S. Cl.
  CPC ............ *H04L 5/001* (2013.01); *H04L 1/0015* (2013.01); *H04L 1/1621* (2013.01);
  (Continued)

(58) Field of Classification Search
  None
  See application file for complete search history.

(56) References Cited

U.S. PATENT DOCUMENTS

| | | | | |
|---|---|---|---|---|
| 2008/0037413 A1* | 2/2008 | Gu | ........................ | H04W 52/56 370/210 |
| 2009/0249153 A1* | 10/2009 | Zhang | ................... | H04L 1/1887 714/748 |

(Continued)

FOREIGN PATENT DOCUMENTS

CN         101044700 A        9/2007

OTHER PUBLICATIONS

Huawei: "A/N transmission in TDD CA", 3GPP Draft; R1-103436 an Transmission in TDD CA, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Jun. 28, 2010, Jun. 22, 2010 (Jun. 22, 2010), M50448965, [retrieved on Jun. 22, 2010].

(Continued)

*Primary Examiner* — Kwang B Yao
*Assistant Examiner* — Hardikkumar Patel
(74) *Attorney, Agent, or Firm* — Norton Rose Fulbright LLP

(57) ABSTRACT

Methods, systems, and devices are described for bundling feedback related to downlink transmissions on a plurality of component carriers (CCs). In some examples, a base station configures a multi-carrier mobile device to use different feedback bundling schemes when it determines that the mobile device is power limited. The bundling scheme configured for the mobile device may be based, in part, on one or more transmission modes of the downlink CCs. Bundling schemes may include combinations of bundling techniques and an order in which these techniques are applied. In particular, the bundling techniques may include CC bundling in combination with spatial bundling and/or feedback repetition. For efficiency and performance, a bundling (Continued)

scheme may require application of CC bundling before resorting to use of feedback repetition.

46 Claims, 10 Drawing Sheets

(51) Int. Cl.
| | |
|---|---|
| H04L 1/00 | (2006.01) |
| H04L 1/16 | (2006.01) |
| H04L 1/18 | (2006.01) |
| H04L 27/26 | (2006.01) |
| H04W 52/34 | (2009.01) |

(52) U.S. Cl.
CPC .......... *H04L 1/1858* (2013.01); *H04L 1/1861* (2013.01); *H04L 5/0098* (2013.01); *H04L 27/2601* (2013.01); *H04L 5/0007* (2013.01); *H04W 52/34* (2013.01)

(56) References Cited

U.S. PATENT DOCUMENTS

| | | | | |
|---|---|---|---|---|
| 2009/0262670 | A1* | 10/2009 | Cho | H04W 52/08 370/280 |
| 2010/0118773 | A1* | 5/2010 | Kawamura | H04J 13/0059 370/328 |
| 2010/0195587 | A1* | 8/2010 | Ratasuk | H04L 1/1614 370/329 |
| 2010/0271970 | A1* | 10/2010 | Pan et al. | 370/252 |
| 2010/0272048 | A1* | 10/2010 | Pan | H04L 1/1635 370/329 |
| 2011/0243066 | A1* | 10/2011 | Nayeb Nazar et al. | 370/328 |
| 2012/0014329 | A1* | 1/2012 | Kwon | H04L 1/1607 370/328 |
| 2012/0127905 | A1* | 5/2012 | Lindoff | H04W 28/04 370/311 |
| 2012/0147831 | A1* | 6/2012 | Golitschek | H04L 1/0026 370/329 |
| 2012/0327910 | A1* | 12/2012 | Dalsgaard | H04L 5/0098 370/335 |

OTHER PUBLICATIONS

International Search Report and Written Opinion—PCT/US2011/047061, ISA/EPO—Oct. 11, 2011.

Nokia et al., "UL ACK/NAK Feedback for Power-Limited UE in LTE -A TDD", 3GPP Draft; R1-102939 an for Power-Limited UE in TDD, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; May 10, 2010, May 4, 2010 (May 4, 2010), XP050420055, [retrieved on May 4, 2010].

Nokia Siemens Networks et al: "On the need for cross-carrier A/N bundling", 3GPP Draft; R1-103790, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Jun. 28, 2010, Jun. 22, 2010 (Jun. 22, 2010), XP050449217, [retrieved on Jun. 22, 2010].

3rd Generation Partnership Project; Technical Specification Group Radio Access Network; Evolved Universal Terrestrial Radio Access (E-UTRA); Physical layer Procedures (Release 9), 3GPP Draft; 3GPP TS 36.213, V9.2.0, 3rd Generation Partnership Project (3GPP), Mobile Competence Centre; 650, Route Des Lucioles; F-06921 Sophia-Antipolis Cedex; France, val RAN WG1, No. Madrid, Spain; Aug. 27, 2010, [retrieved on Aug. 27, 2010], 80 pages.

Huawei: "On the necessity of ACK/NACK bundling for carrier aggregation", 3GPP Draft; R1-103885, 3rd Generation Partnership Project (3GPP), Mobile Competence Centre; 650, Route Des Lucioles; F-06921, Sophia-Antipolis Cedex; France, val. RAN WG1, No. Dresden, Germany; Jun. 28, 2010, Jun. 22, 2010, [retrieved on Jun. 22, 2010].

Nokia, Nokia Siemens Networks, UL ACK/NAK Feedback forPower-Limited UE in LTE-A TDD, 3GPP TSG RAN WG1 meeting #61bis, Jun. 22, 2010, R1-103788, URL.http://www.3gpp.org/ftp/tsg_ran/wg1_rl1/TSGR1_61b/Docs/R1-103788.zip.

Qualcomm Incorporated, On the need of power limited multi-bit ACK format, 3GPP TSG-RAN WG2 #62, Aug. 17, 2010, R1-104783, URL, http://www.3gpp.org/ftp/tsg_rl1/TSGR1_62/Docs/R1-104783.zip.

* cited by examiner

FEEDBACK BUNDLING FOR POWER-LIMITED DEVICES IN WIRELESS COMMUNICATIONS

CROSS REFERENCES

The present application for patent claims priority to U.S. Provisional Patent Application No. 61/373,773, filed Aug. 13, 2010, assigned to the assignee hereof, and expressly incorporated by reference herein.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Feedback mechanisms can also be employed by the wireless communication system, such as hybrid automatic repeat/request (HARQ) or similar mechanisms, such that a first node can report acknowledgement (ACK) or negative-acknowledgement (NACK) for communications from a second node. In this regard, the second node can retransmit communications for which NACK is reported by the first node. In addition, in LTE-Advanced (LTE-A) systems, wireless terminals can be configured with two or more component carriers from one or more base stations to increase throughput and/or diversity. Transmitting feedback for the multiple component carriers can require additional resources at the wireless terminal, which consumes power and can inhibit data rate.

SUMMARY

Methods, systems, and devices are described for bundling feedback related to downlink transmissions on a set of component carriers (CCs). In some examples, a base station configures a multi-carrier mobile device to use different feedback bundling schemes when it determines that the mobile device is power-limited. The bundling scheme used with the mobile device may be based, in part, on one or more transmission modes of the downlink CCs. Bundling schemes may include combinations of bundling techniques and an order in which these techniques are applied. In particular, the bundling techniques may include CC bundling in combination with spatial bundling and/or feedback repetition. For efficiency and performance, a bundling scheme may specify application of CC bundling before use of feedback repetition.

In one example, a method of identifying one or more feedback bundling scheme(s) for a mobile device may comprise: determining that a mobile device is power limited on at least one uplink carrier; identifying downlink transmission modes for two or more downlink component carriers based on the determination that the mobile device is power limited; and identifying at least one feedback bundling scheme on the at least one uplink carrier for confirming receipt of the downlink transmissions on the two or more downlink component carriers.

The method may also include signaling the identified feedback bundling scheme to the mobile device. In an example, the method may further comprise transmitting information to the mobile device using the two or more downlink component carriers in accordance with the downlink transmission modes; and receiving feedback from the mobile device in accordance with the identified feedback bundling scheme. In another example, the method may also include determining receipt of the transmitted information by the mobile device based on the received feedback; and retransmitting at least a portion of the information based on the determined receipt of information.

The at least one feedback bundling scheme may comprise, for example, one or more of: a scheme for bundling acknowledgment/negative acknowledgments (ACK/NACKs) for each of the two or more downlink component carriers into a single ACK/NACK; a scheme for bundling ACK/NACKs corresponding to a plurality of codewords within a single downlink component carrier into a single ACK/NACK; a scheme for bundling ACK/NACKs for the two or more downlink component carriers, and bundling ACK/NACKs from two codewords for at least one other downlink component carrier into a single ACK/NACK; and a scheme for bundling ACK/NACKs for two or more subframes in a time division duplex (TDD) component carrier into a single ACK/NACK. In one example, the at least one feedback bundling scheme comprises: a first sub-scheme comprising bundling ACK/NACKs for the two or more downlink component carriers, and a second sub-scheme comprising performing repetition of ACK/NACKs, wherein the second sub-scheme is utilized in connection with the first sub-scheme.

The determining that a mobile device is power limited on an uplink carrier may be based on a power headroom report received from the mobile device. The method may also include configuring the mobile device to cancel transmission of one or more signals in connection with the feedback bundling scheme. Such configuring may comprise, for example, configuring the mobile device to cancel transmission of Channel-Quality-Information and Channel-State-Information (CQI/CSI) feedback.

The identifying a mode for downlink transmissions may comprise, for example, selecting a single codeword transmit mode. In another example, the method further comprises: configuring a plurality of downlink component carriers for communicating with the mobile device; and scheduling communications on a subset of the configured downlink component carriers, wherein the at least one feedback bundling scheme comprises a scheme for bundling ACK/NACKs across the scheduled downlink component carriers into a single ACK/NACK. Another example further comprises: configuring a plurality of downlink component carriers for communicating with the mobile device; and activating a subset of the configured downlink component carriers, wherein the at least one feedback bundling scheme comprises a scheme for bundling ACK/NACKs for the activated downlink component carriers into a single ACK/NACK. Such a method may also include scheduling communications on a subset of the activated downlink component carriers, wherein the at least one feedback bundling scheme comprises a scheme for bundling ACK/NACKs for the scheduled downlink component carriers into a single ACK/NACK. The method may further include notifying the mobile device of the scheduled downlink component carriers.

In another example, the method further comprises: identifying a first subset of the downlink component carriers based on a frequency band of the component carriers; and bundling ACK/NACKs for the first subset of downlink component carriers into a single ACK/NACK.

In another example, a wireless communication apparatus may comprise: means for determining that a mobile device is power limited on at least one uplink carrier; means for identifying downlink transmission modes on two or more downlink component carriers based on the determination that the mobile device is power limited; and means for identifying at least one feedback bundling scheme on the at least one uplink carrier for confirming receipt of the downlink transmissions on the two or more downlink component carriers.

The at least one feedback bundling scheme may, for example, comprise one or more of: a scheme for bundling ACK/NACKs for each of the two or more downlink component carriers into a single ACK/NACK; a scheme for bundling ACK/NACKs corresponding to a plurality of codewords within a single downlink component carrier into a single ACK/NACK; and a scheme for bundling ACK/NACKs across the two or more downlink component carriers, and bundling ACK/NACKs from two codewords for at least one other downlink component carrier into a single ACK/NACK. In one example, the at least one feedback bundling scheme comprises: a first sub-scheme comprising bundling ACK/NACKs across the two or more downlink component carriers; and a second sub-scheme comprising performing repetition of ACK/NACKs, wherein the second sub-scheme is utilized in connection with the first sub-scheme.

The wireless communication apparatus may further comprise, in an example: means for configuring a plurality of downlink component carriers for communicating with the mobile device; and means for scheduling communications on a subset of the configured downlink component carriers, wherein the at least one feedback bundling scheme comprises a scheme for bundling ACK/NACKs for the scheduled downlink component carriers into a single ACK/NACK. In another example, the apparatus further comprises: means for configuring a plurality of downlink component carriers for communicating with the mobile device; and means for activating a subset of the configured downlink component carriers, wherein the at least one feedback bundling scheme comprises a scheme for bundling ACK/NACKs from the activated downlink component carriers into a single ACK/NACK. In another example, the apparatus further comprises means for scheduling communications on a subset of the activated downlink component carriers, wherein the at least one feedback bundling scheme comprises a scheme for bundling ACK/NACKs for the scheduled downlink component carriers into a single ACK/NACK.

In another example, a wireless communication apparatus comprises: a power headroom determination module configured to determine that a mobile device is power limited on at least one uplink carrier; a downlink mode identification module in communication with the power headroom determination module, and configured to identify downlink transmission modes on two or more downlink component carriers based on the determination that the mobile device is power limited; and a feedback bundling scheme module, in communication with the downlink mode communication module, and configure to identify at least one feedback bundling scheme on the at least one uplink carrier for confirming receipt of the downlink transmissions on the two or more downlink component carriers.

The at least one feedback bundling scheme may comprise, for example, one or more of: a scheme for bundling ACK/NACKs across the two or more downlink component carriers into a single ACK/NACK; a scheme for bundling ACK/NACKs corresponding to a plurality of codewords within a single downlink component carrier into a single ACK/NACK; a scheme for bundling ACK/NACKs across the two or more downlink component carriers, and further bundling ACK/NACKs from two codewords for at least one other downlink component carrier into a single ACK/NACK. In another example, the at least one feedback bundling scheme comprises: a first sub-scheme comprising bundling ACK/NACKs across the two or more downlink component carriers; and a second sub-scheme comprising performing repetition of ACK/NACKs, wherein the second sub-scheme is utilized in connection with the first sub-scheme.

In an example, the downlink mode identification module is further configured to: configure a plurality of downlink component carriers for communicating with the mobile device; and schedule communications on a subset of the configured downlink component carriers, wherein the at least one feedback bundling scheme comprises a scheme for bundling ACK/NACKs for the scheduled downlink component carriers into a single ACK/NACK. In one example, the apparatus comprises a processor.

In another example, a computer program product for wireless communication comprises a computer readable medium comprising: code for determining that a mobile device is power limited on at least one uplink carrier; code for identifying downlink transmission modes on two or more downlink component carriers based on the determination that the mobile device is power limited; and code for identifying at least one feedback bundling scheme on the at least one uplink carrier for confirming receipt of the downlink transmissions on the two or more downlink component carriers.

The at least one feedback bundling scheme may comprise, for example, one or more of: a scheme for bundling ACK/NACKs across the two or more downlink component carriers into a single ACK/NACK; a scheme for bundling ACK/NACKs from a plurality of codewords within a single downlink component carrier into a single ACK/NACK; a scheme for bundling ACK/NACKs for the two or more downlink component carriers, and bundling ACK/NACKs from two codewords for at least one other downlink component carrier into a single ACK/NACK. In another example, the at least one feedback bundling scheme comprises: a first sub-scheme comprising bundling ACK/NACKs for the two or more downlink component carriers; and a second sub-scheme comprising performing repetition of ACK/NACKs, wherein the second sub-scheme is utilized in connection with the first sub-scheme.

The computer program product may also comprise: code for configuring a plurality of downlink component carriers for communicating with the mobile device; and code for scheduling communications on a subset of the configured downlink component carriers, wherein the at least one feedback bundling scheme comprises a scheme for bundling ACK/NACKs for the scheduled downlink component carriers into a single ACK/NACK.

In still another example, a wireless communications apparatus, comprises: a receiver configured to receive a plurality of downlink transmissions over a plurality of component carriers from a base station; a downlink mode identification module configured to identify a mode associated with the received downlink transmissions; a feedback scheme identification module configured to identify a feedback bundling scheme for acknowledging receipt of the downlink transmissions, the feedback bundling scheme based at least in part on the downlink mode for a power limited mobile device; a feedback generation module configured to bundle feedback confirming receipt of the downlink transmissions on the downlink component carriers according to the identified feedback bundling scheme; and a transmitter configured to transmit the bundled feedback to the base station on an uplink carrier.

The at least one feedback bundling scheme may comprise, for example, one or more of: a scheme for bundling ACK/NACKs for each of the two or more downlink component carriers into a single ACK/NACK; a scheme for bundling ACK/NACKs from a plurality of codewords within a single downlink component carrier into a single ACK/NACK; a scheme for bundling ACK/NACKs for the two or more downlink component carriers, and bundling ACK/NACKs from two codewords for at least one other downlink component carrier into a single ACK/NACK. In another example, the at least one feedback bundling scheme comprises: a first sub-scheme comprising bundling ACK/NACKs for the two or more downlink component carriers; and a second sub-scheme comprising performing repetition of ACK/NACKs, wherein the second sub-scheme is utilized in connection with the first sub-scheme.

In another example, a method of wireless communication from a power limited mobile device comprises: receiving downlink transmissions over a plurality of downlink component carriers from a base station; identifying a mode associated with the received downlink transmissions; identifying at least one feedback bundling scheme on at least one uplink carrier for confirming receipt of the downlink transmissions, the feedback bundling scheme associated with the mode for a power limited mobile device; bundling feedback confirming receipt of the downlink transmissions on the downlink component carriers according to the feedback bundling scheme; and transmitting the bundled feedback to the base station on the at least one uplink carrier. The method may further comprise providing transmit power information to a base station over at least one uplink carrier.

The at least one feedback bundling scheme may comprise, for example, one or more of: a scheme for bundling acknowledgment/negative acknowledgments (ACK/NACKs) for each of the component carriers into a single ACK/NACK; and a scheme for bundling acknowledgment/negative acknowledgments (ACK/NACKs) from a plurality of codewords within a single component carrier into a single ACK/NACK. In another example, the at least one feedback bundling scheme comprises: a first sub-scheme comprising bundling acknowledgment/negative acknowledgments (ACK/NACKs) for the two or more downlink component carriers; and a second sub-scheme comprising performing repetition of ACK/NACKs, wherein the second sub-scheme is utilized in connection with the first sub-scheme.

The foregoing has outlined rather broadly the features and technical aspects of examples according to disclosure. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, methods, devices, and computer program products are described for bundling feedback related to downlink transmissions on a plurality of component carriers (CCs). In some examples, a base station configures a multi-carrier mobile device to use different feedback bundling schemes to reduce the quantity of feedback data to be transmitted on an uplink CC when it determines that the mobile device is power limited. The bundling scheme selected for the mobile device may be based, in part, on one or more transmission modes of the downlink CCs. Bundling schemes may include combinations of bundling techniques and an order in which these techniques are applied. In particular, the bundling techniques may include CC bundling in which ACK/NACK feedback is bundled across component carriers in combination with spatial bundling and/or feedback repetition. For efficiency and performance, a bundling scheme may apply CC bundling before resorting to use of feedback repetition.

The base station may facilitate certain types of bundling (e.g., CC bundling) by selecting single codeword transmission modes. Other aspects include, configuring CC bundling on a per subset basis where a subset of CCs may include CCs in a same frequency band, and limiting bundling operations to feedback for scheduled, as opposed to simply configured or configured-and-activated, CCs. Bundling of feedback may be combined with cancelling one or more other transmissions from a mobile device, such as Channel-Quality-Information and Channel-State-Information (CQI/CSI). Bundling schemes may include bundling acknowledgment/negative acknowledgments (ACK/NACKs) across two or more downlink CCs, bundling ACK/NACKs from a plurality of codewords within a single downlink CC, and/or bundling ACK/NACKs for two or more subframes in a time division duplex (TDD) CC into a single ACK/NACK.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
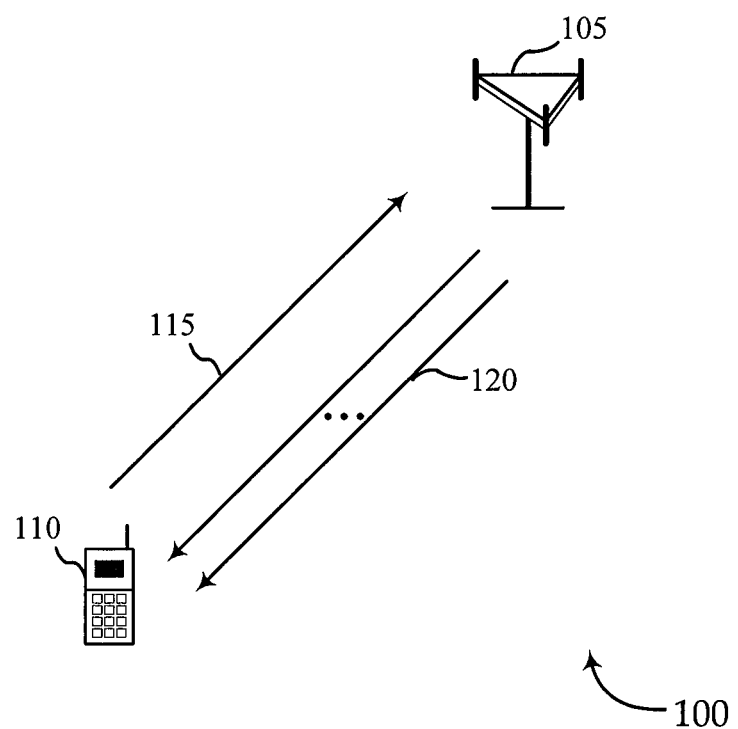
FIG. 1 illustrates a wireless communication system.

Referring first to FIG. 1, a block diagram illustrates an example of a wireless communications system 100. The system 100 includes a base station 105 and a mobile device 110. Of course, such a system typically includes a number of base stations 105 and mobile devices 110, with a single base station 105 and mobile device 110 illustrated in FIG. 1 for purposes of simplifying the discussion of the system. Base station 105 may be a macrocell, femtocell, picocell, and/or similar base station, a mobile base station, or relay node, for example. The system 100 supports operation on multiple component carriers (CCs), each of which include waveform signals of different frequencies. In FIG. 1, an uplink CC 115 carries uplink transmissions from the mobile device 110 to the base station 105. In some cases, multiple uplink CCs carry uplink transmissions from the mobile device 110 to the base station 105. Multiple downlink CCs 120 carry downlink transmissions from the base station 105 to the mobile device 110, with acknowledgment of receipt of downlink transmissions on the downlink CCs 120 bundled and transmitted to the base station 105 on uplink CC (or uplink CCs) 115. Each modulated signal may be sent on a different carrier and may carry control information (e.g., pilot signals), overhead information, data, etc. The system 100 may be a multi-carrier LTE network capable of efficiently allocating network resources.

The base station 105 may wirelessly communicate with the mobile device 110 via one or more base station antenna(s). The base station 105 is configured to communicate with the mobile devices 110 under the control of a base station controller via multiple downlink and/or uplink CCs. The base station 105 may be a node B (NB), or an enhanced node B (eNB). The base station 105 may provide communication coverage for a particular geographic area, with other base stations 105 that may provide coverage for different geographic areas. A plurality of mobile devices 110 may be dispersed throughout the coverage area. The mobile device 110 may be a mobile station, mobile device, access terminal (AT), user equipment (UE), or subscriber unit. Such a mobile device 110 may include a cellular phone and wireless communications device, but may also include a personal digital assistant (PDA), smartphone, other handheld device, netbook, notebook computer, tablet computer, etc.

For the discussion, it may be assumed that mobile device 110 is initially operating on (is "camped on") base station 105. As mobile device 110 moves throughout the geographic area, the channel conditions of the uplink and downlink CCs can vary. For example, at the edge of the geographic coverage area, channel conditions for an uplink CC may result in the mobile device 110 approaching a limitation on the amount of power that may be provided for uplink transmission. Of course, such conditions may occur at other locations within a service area of a base station 105. Mobile devices 105 that are operating at or near the limitation on the amount of power that may be provided for uplink transmission are referred to as power limited mobile devices. In various examples, as will be described in more detail herein, base station 105 may configure mobile device 110 to use different feedback bundling schemes to reduce the quantity of feedback data to be transmitted on an uplink CC 115 when it is determined that mobile device 110 is power limited.

In some examples, the base station 105 configures a multi-carrier mobile device 110 to use different feedback bundling schemes to reduce the quantity of feedback data to be transmitted on an uplink CC 115 from a power limited mobile device 110. The bundling scheme selected may be based on the number the downlink CCs 120. Bundling schemes to be used on an uplink CC 115 may include combinations of bundling techniques and an order in which these techniques are applied. Specifically, the bundling techniques may include CC bundling in combination with spatial bundling and/or feedback repetition such as HARQ-ACK repetition. For efficiency and performance, a bundling scheme may apply CC bundling before resorting to use of feedback repetition.

The base station 105 may facilitate certain types of bundling (e.g., CC bundling) on an uplink CC 115 by selecting single codeword transmission modes for mobile device 110. Other aspects may include configuring CC bundling on a per subset basis where a subset of CCs may include CCs in a same frequency band, and limiting bundling operations to feedback for scheduled, as opposed to simply configuring or configuring-and-activating, CCs. Bundling of feedback may be combined with configuring the mobile device 110 to drop or cancel one or more other transmissions, such as Channel-Quality-Information and Channel-State-Information (CQI/CSI). Bundling schemes may include bundling acknowledgment/negative acknowledgments (ACK/NACKs) across each of two or more downlink CCs, bundling ACK/NACKs from a plurality of codewords within a single downlink CC, and/or bundling ACK/NACKs for two or more subframes in a time division duplex (TDD) CC into a single ACK/NACK.

Figure 2:
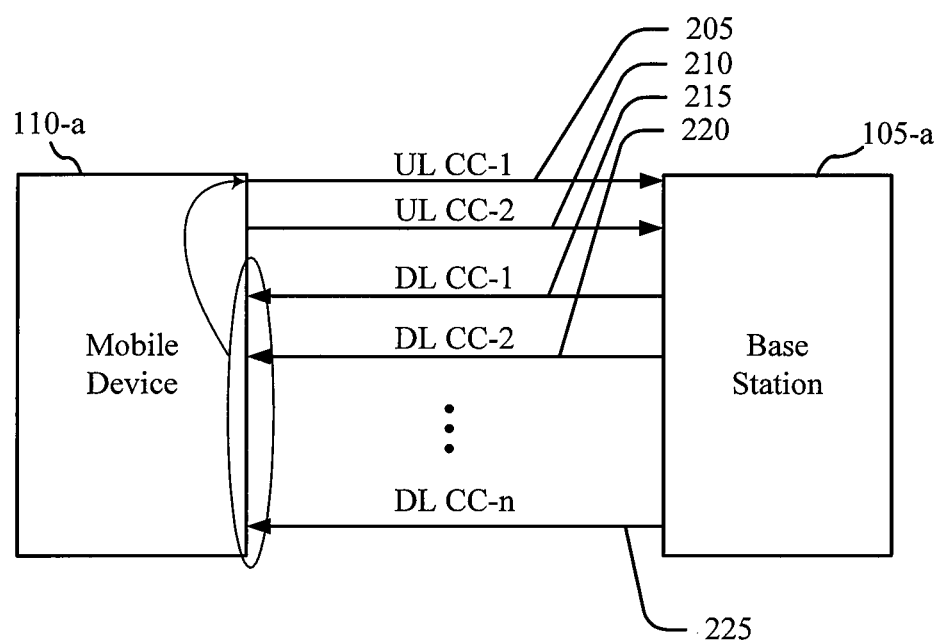
FIG. 2 is a block diagram of a wireless communication system for communicating over multiple component carriers (CCs) and bundling feedback for multiple CCs.

With reference now to FIG. 2, a block diagram of a wireless communication system 200 for communicating over multiple CCs and bundling feedback for multiple CCs is described. System 200 includes a mobile device 110-*a* that communicates with a base station 105-*a* to access a wireless network (not shown). Mobile device 110-*a* may be the mobile device 110 of FIG. 1, and base station 105-*a* may be base station 105 of FIG. 1. The mobile device 110-*a* and base station 105-*a* communicate over multiple CCs 205 through 225. As depicted, mobile device 110-a can communicate with base station 105-a over uplink CCs 205 and 210. Such communication with the base station 105-a may include HARQ feedback, which includes ACK/NACK feedback to acknowledge receipt of downlink transmissions. In various examples described herein, the mobile device 110-a may bundle ACK/NACK feedback and thereby reduce feedback overhead over uplink CCs 205 and 210. Of course, more of fewer uplink CCs may be present depending upon the particular system and operating conditions. Similarly, base station 105-a can communicate with mobile device 110-a over downlink CCs 215 through 225. The multiple uplink (UL) and downlink (DL) CCs 205-225 provide transmit diversity, increased throughput, and/or the like. In addition, it is to be appreciated that base station 105-a can communicate with mobile device 110-a over substantially any number of DL or UL CCs.

Mobile device 110-a can generate feedback for communications received over the multiple DL CCs 215-225, and can transmit the feedback to base station 105-a. In cases where mobile device 110-a is operating with two or more uplink and/or downlink CCs one of the CCs is configured as the primary CC (PCC). The transmission of feedback for multiple downlink CCs may be accomplished through one uplink CC, namely, the uplink PCC. In the example of FIG. 2, the uplink PCC is UL CC-1 205, which carries feedback for DL CCs 215-225. Such feedback, for example, can relate to HARQ feedback that specifies ACK or NACK related to whether communications are received and processed over the given DL CC. Mobile device 110-a can transmit the feedback to base station 105-a over UL CC-1 205 for the DL CCs 215-225, and base station 105-a can retransmit communications over any DL CCs 215-225 for which NACK is received in the related feedback. In one example, mobile device 110-a can bundle feedback for the multiple downlink CCs 215-225 to conserve bandwidth required for transmitting the feedback on UL CC-1 205. In this regard, base station 105-a, in one example, can retransmit the particular downlink transmission over substantially all DL CC's 215-225 related to the bundled feedback where NACK is received.

Bundling feedback may be beneficial because when providing feedback for multiple DL CCs (such as CCs 215-225) the ACK/NACK feedback overhead on the PCC (such as CC-1 205) may be significant. For example, in the case of five DL CCs, the feedback payload may be up to 10-bits, which, in various examples, would be transmitted to base station 105-a on UL CC-1 205. If discontinuous transmission (DTX) is supported, the payload size may be furthered increased to 12 bits in some cases. Examples herein provide for reduction of feedback overhead through the use of one or more feedback bundling schemes. Such feedback bundling schemes include spatial bundling, CC bundling, and subframe bundling.

Spatial bundling involves bundling ACK/NACKs for two codewords in the same physical downlink control channel (PDCCH) into a single ACK/NACK. Bundling may be accomplished through, for example, a logical AND of the ACK/NACK bits from each of the codewords. Such spatial bundling may be implemented depending upon the transmission mode for communications between the mobile device 110-a and the base station 105-a. Spatial bundling may be used, for example, in transmission modes having CCs configured with DL MIMO modes. Bundling ACK/NACKs for two codewords in such a manner reduces whatwould traditionally be 2-bit feedback to 1-bit feedback. Another feedback bundling scheme may include component carrier (CC) bundling, where the ACK/NACKs for two or more CCs can be logically bundled into a single ACK/NACK. This can degenerate multi-carrier ACK/NACK feedback to a single carrier case. A third feedback bundling scheme may include subframe-bundling. In this subframe bundling feedback scheme, which applies to time division duplex (TDD) modes of operation, the ACK/NACKs for two or more subframes can be logically bundled. This degenerates the asymmetric ACK/NACK feedback (multi-DL subframes mapped to one UL subframe) in TDD to the symmetric ACK/NACK feedback (one to one DL/UL mapping) in frequency division duplex (FDD) modes of operation. In situations where two or more of these feedback schemes are applicable, combinations of the different feedback schemes may be utilized.

Thus, utilizing one or more of these feedback bundling schemes, the feedback overhead for the uplink PCC may be reduced. In situations where mobile device 110-a is power limited on uplink CC(s), transmitting larger quantities of feedback information reliably in a multi-carrier configuration can present challenges because of relatively poor channel quality common in such situations. Furthermore, it may commonly be the case that uplink and downlink channel conditions may be imbalanced. Specifically, while mobile device 110-a may see relatively favorable downlink channel conditions, it may experience unfavorable uplink channel conditions. Such a scenario may likewise negatively impact efficient downlink HARQ operation when the mobile device 110-a is configured with two or more DL CCs. In such cases, transmissions of HARQ ACK/NACK feedback from mobile device 110-a to base station 105-a may need to be repeated one or more times before the feedback is successfully received at the base station 105-a. This may delay subsequent downlink transmissions to the mobile device 110-a and thus negatively impact data transmission rates. Reducing feedback overhead can reduce the amount of data required to be transmitted, and also increase the likelihood of successful transmission from the mobile device 110-a to the base station 105-a. Thus, feedback bundling such as described in examples described herein may enhance communications efficiency in such situations.

Table 1 provides a comparison of CC-bundling and spatial bundling of ACK/NACK for FDD for cases of two DL CCs and five DL CCs. While CC-bundling naturally results in a payload independent of the number of configured CCs, spatial bundling generally brings down the ACK/NACK overhead by half with an overhead ranging from one bit (for two CCs) to five bits (for 5 CCs). For two CCs, CC-bundling and spatial bundling generates the same max ACK/NACK payload size. As is understood, wireless communications standards provide for operation in one of several different transmit modes, such as the defined transmit modes for LTE-A. In the case of a power limited mobile device, one possible transmission mode would have two DL CCs configured with SIMO DL transmission modes, in which case CC-bundling would provide a feedback payload size of 1-bit, in contrast with 2-bit for the spatial bundling (effectively no spatial bundling) case, as can be seen in Table. 1.

TABLE 1

Comparison of CC-bundling and spatial bundling for FDD for power limited UEs

| Options | Max ACK/NACK Overhead | |
| --- | --- | --- |
|  | 2 CCs | 5 CCs |
| Nominal | 4-bit | 10-bit |
| CC-bundling | 2-bit | 2-bit |
| Spatial-bundling | 2-bit | 5-bit |
| CC-bundling and Spatial bundling | 1-bit | 1-bit |

In some examples, joint CC-bundling and spatial bundling for FDD are enabled through the base station 105-a selecting transmit modes that support feedback payload reduction through feedback bundling. For example, the base station 105-a may select a transmit mode that uses only a single codeword for purposes of HARQ feedback. In other examples, feedback bundling may always be performed. In other examples, selected transmit modes (i.e., LTE-A transmit modes 3 or 4) may be treated as error cases with bundling performed. Feedback bundling may further be used in conjunction with feedback repetition. For example, mobile device 110-a may be configured with ACK/NACK repetition with a factor of $N_{rep}$=2, 4 or 6. In cases using ACK/NACK repetition, the mobile device 110-a may only transmit ACK/NACK information in a subframe, and any other concurrent UL signals may be discontinued. In addition, according to HARQ protocols, a mobile device 110-a transmits ACK/NACK information only periodically (i.e., every $N_{rep}$). Thus, any subsequent back-to-back DL transmissions within the period that ACK/NACK feedback is being repeated would not receive any ACK/NACK feedback, potentially impacting downlink data transmission rates. In some examples, such ACK/NACK feedback repetition is used only in the event that feedback is not properly received by the base station 105-a.

In some situations, a mobile device 110-a may be configured to operate on a certain number of CCs, referred to as $M_{configured}$ CCs. Depending upon the use of the mobile device 110-a and the quantity of downlink transmissions, only a subset of the configured CCs may be activated, referred to as $M_{activated}$ CCs. Further, in some examples, at any given subframe, the mobile device 110-a may be scheduled only on a subset of the activated CCs, referred to as $M_{scheduled}$ CCs, with downlink transmissions transmitted using the scheduled CCs. The following condition holds:

$$M_{scheduled} \leq M_{activated} \leq M_{configured}$$

In cases where fewer than all of the configured CCs are to be used for downlink transmissions, CC bundling may be performed only on the CCs that are used for downlink transmissions, namely $M_{scheduled}$ or $M_{activated}$. In such cases, if CC bundling is performed based on the $M_{configured}$ CCs (or the $M_{activated}$ activated CCs when $M_{scheduled} < M_{activated}$), feedback may be inefficient. Thus, in some examples, CC bundling is performed only on activated CCs, rather than on configured CCs. In other examples, CC bundling is performed only on scheduled CCs, rather than on activated or configured CCs. The determination of $M_{scheduled}$ CCs for a subframe may be made according to a downlink assignment index (DAI) which may be transmitted in a bitmap format to the mobile device 110-a, for example.

Comparing CC-bundling and ACK/NACK repetition for power limited mobile devices 110-a, CC-bundling is generally more efficient as it provides the possibility of back-to-back ACK/NACK feedbacks for different DL subframes. In some cases, feedback payload may be further reduced by cancelling Channel-Quality-Information and Channel-State-Information (CQI/CSI) channel feedback when CC-bundling is configured for a mobile device 110-a. In other cases, UL signals, such as CQI/CSI channel feedback, may be transmitted depending on the actual channel condition, with channel conditions above or below certain thresholds triggering whether to transmit the feedback. In some examples, prioritization is applied, in which CC bundling is applied first, before ACK/NACK repetition for power limited mobile devices 110-a. That is, ACK/NACK repetition is not configured separately for power limited mobile devices 110-a in multi-carrier operation if ACK/NACK bundling is not configured.

In still further cases, the mobile device 110-a may be configured to support CC-bundling on one or more subsets of configured, activated, or scheduled CCs. In such cases, the configured CCs, for example, can be organized into a few subsets, each containing one or more CCs. CC-bundling is then performed on a per subset basis, and mobile device 110-a may provide ACK/NACK feedback for multiple subsets simultaneously. The organization of subsets may be based on one of a number of different criteria, such as frequency bands of CCs, etc. The subsets can be orthogonal or overlapping (e.g., such that one or more subsets include one or more same CCs). Mobile device 110-a, in this regard, can transmit bundled feedback for each subset over uplink CC-a 205 to base station 105-a.

Figure 3:
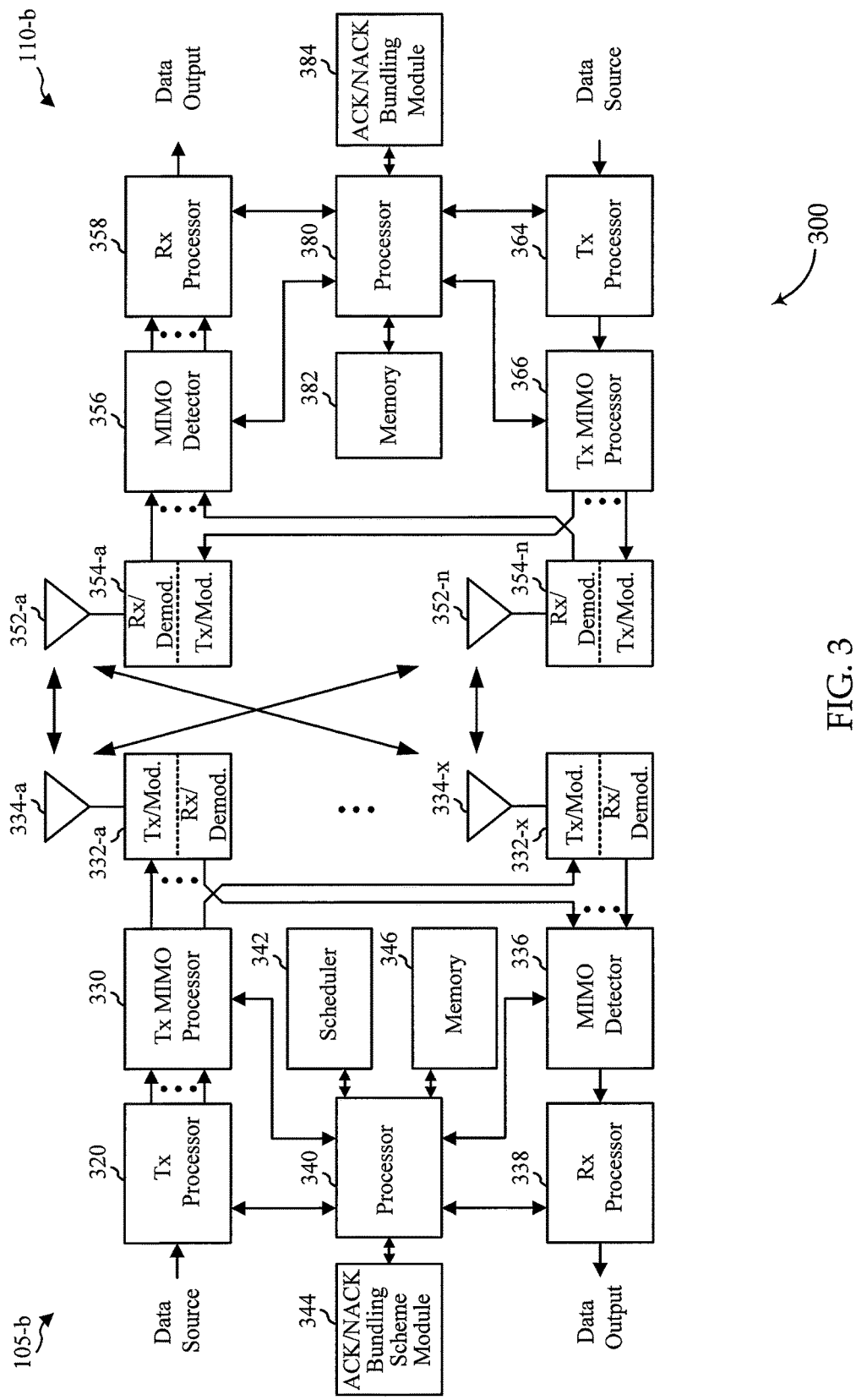
FIG. 3 is a block diagram of a transmitter and receiver in a wireless communications system.

FIG. 3 is a block diagram of a system 300 including a base station 105-b and a mobile device 110-b. This system 300 may be the system 100 of FIG. 1 or system 200 of FIG. 2. The base station 105-b may be equipped with antennas 334-a through 334-x, and the mobile device 110-b may be equipped with antennas 352-a through 352-n. At the base station 105-b, a transmit processor 320 may receive data from a data source and feedback information from a processor 340, memory 342, and/or ACK/NACK bundling scheme module 344. The feedback information may include feedback bundling information such as bundled ACK/NACK feedback according to an identified feedback bundling scheme that the mobile device 110-b is operating under. ACK/NACK bundling scheme module 344 in some examples configures mobile device 110-b to use different feedback bundling schemes. ACK/NACK bundling scheme module 344 may select the bundling scheme based, in part, on one or more transmission modes of the downlink CCs and a determination that the mobile device 110-b is power limited.

Transmit processor 320 may also receive control information from a processor 340, a scheduler 342, an ACK/NACK bundling scheme module 344, and/or memory 346. The scheduler 342 may schedule the mobile device on a subset of configured carriers under the influence of processor 340 and/or ACK/NACK bundling scheme module 344. The uplink feedback is deterministic so not scheduled by base station 105-b. The control information may identify the downlink CC mode, schedule feedback transmissions on uplink carriers, and identify the bundling scheme to be used for a particular mobile device 110-b. The transmit processor 320 may process (e.g., encode and symbol map) the data, feedback information, and control information to obtain data symbols and control symbols, respectively. The transmit processor 320 may also generate reference symbols and cell-specific reference signals. A transmit (TX) multiple-input multiple-output (MIMO) processor 330 may perform spatial processing (e.g., precoding) on the data symbols, the control symbols, and/or the reference symbols, if applicable, and may provide output symbol streams to the transmit modulators 332-*a* through 332-*x*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332-*a* through 332-*x* may be transmitted via the antennas 334-*a* through 334-*x*, respectively.

At the mobile device 110-*b*, the antennas 352-*a* through 352-*n* may receive the downlink signals from the base station 105-*b* and may provide the received signals to the demodulators 354-*a* through 354-*n*, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354-*a* through 354-*n*, perform MIMO detection on the received symbols if applicable, and provide detected symbols. A receive processor 358 may process (e.g., demodulate, deinterleave, and decode) the detected symbols, providing decoded data for the mobile device 110-*b* to a data output, and provide decoded control information to a processor 380, memory 382, or ACK/NACK bundling module 384. ACK/NACK bundling module 384 may perform processing to identify downlink carriers, downlink transmission modes, and a bundling scheme, and perform operations to be used for confirming receipt of downlink transmissions by the mobile device 105-*b* according to ACK/NACK feedback transmission on the uplink CC. ACK/NACK bundling module 384, in some examples, bundles ACK/NACK feedback according to the bundling scheme identified by ACK/NACK bundling scheme module 344.

On the uplink, at the mobile device 110-*b*, a transmit processor 364 may receive and process data (e.g., codewords for use in HARQ feedback) from a data source and control information (e.g., the feedback bundling scheme) from the processor 380 and ACK/NACK bundling module 384. The transmit processor 364 may also generate reference symbols for a reference signal. The symbols from the transmit processor 364 may be precoded by a TX MIMO processor 366 if applicable, further processed by the demodulators 354-*a* through 354-*n* (e.g., for SC-FDMA, etc.), and be transmitted to the base station 105-*b*. At the base station 105-*b*, the uplink signals from the mobile device 110-*b* may be received by the antennas 334, processed by the demodulators 332, detected by a MIMO detector 336 if applicable, and further processed by a receive processor 338 to obtain decoded data and control information sent by the mobile device 110-*b*. The processor 338 may provide the decoded data to a data output and the decoded control information to the processor 340 and/or ACK/NACK bundling scheme module 344.

Figure 4A:
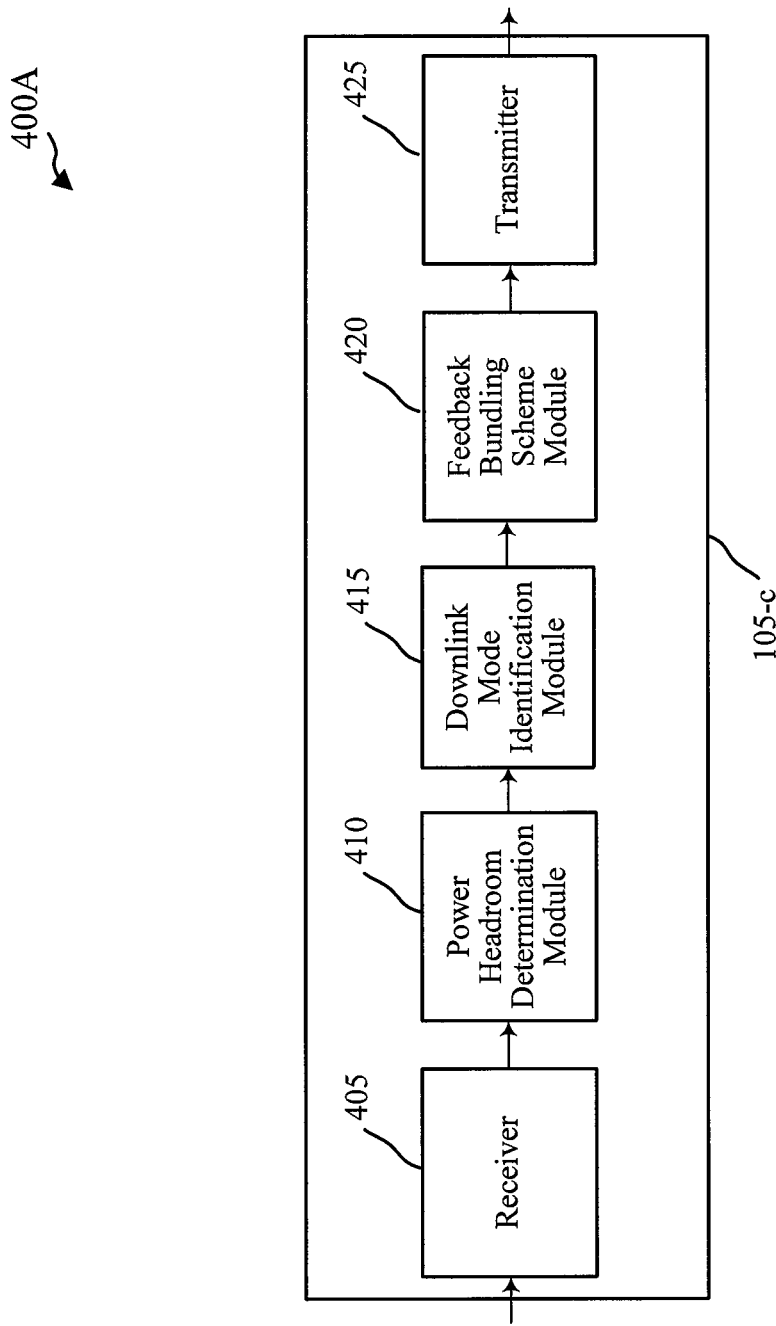
FIG. 4A is a block diagram of a feedback bundling scheme module that facilitates bundling feedback values for multiple CCs.

Turning now to FIG. 4A, a simplified block diagram 400A shows a device 105-*c*. The device 105-*c* may be base station 105 of FIG. 1, 2, or 3, or a portion of such a base station. Device 105-*c* includes a receiver 405, a power headroom determination module 410, a downlink mode identification module 415, a feedback bundling scheme module 420, and a transmitter 425. The device 105-*c*, or individual components thereof, may be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors. Each of the noted modules may be a means for performing one or more functions related to operation of the device 105-*c*.

The receiver 405 may receive communications, via one or more antennas (not shown) from one or more mobile devices. These communications may include power headroom reports containing power headroom information for multi-carrier mobile devices such as mobile devices 110. The power headroom determination module 410 may be configured to calculate a power headroom available for a mobile device using received communications. The power headroom determination module 410 may determine that a particular mobile device is power limited, and provide this information to downlink mode identification module 415 and/or feedback bundling scheme module 420.

Downlink mode identification module 415 may operate to identify downlink transmission modes for component carriers configured for use by a mobile device. As described above, the downlink transmission mode may determine a number of codewords for which ACK/NACK feedback is needed. The transmission mode may be configured on a per-CC basis, and each mobile device may support communications with base station 105 on different CCs using the same or different DL transmission modes. Adjusting the transmit mode may support feedback bundling, particularly in the case of a power limited mobile device operating with multiple downlink component carriers. Feedback bundling scheme module 420 may operate to identify a feedback bundling scheme based on the configured downlink transmission mode(s). Transmitter 425 may transmit the identified downlink transmission mode and feedback bundling scheme to be used.

In addition, feedback bundling scheme module 420 may also indicate one or more parameters regarding repetitive feedback (i.e., HARQ-ACK repetition), as described above. Moreover, for example, feedback bundling scheme module 420 can indicate whether to bundle CC feedback across a subset of CCs, which may include configured CCs, activated CCs, scheduled CCs, and/or the like, similarly as described above. In this regard, for example, feedback bundling scheme module 420 may communicate the one or more feedback format parameters to the mobile device, and mobile device can bundle (and/or repeat) feedback according to the one or more parameters to reduce feedback overhead (and/or improve reliability of the feedback transmissions).

Moreover, in an example, downlink mode identification module 420 may determine transmission modes for a mobile device based at least in part on determining a power-limited condition of the module device in order to decrease required feedback resources. In this regard, feedback for the CCs may be restricted to 1-bit per subframe, and, thus, bundled feedback for the CCs can also be 1-bit per subframe. Another example is to apply both bundling feedback across CCs and bundling across multiple codewords within a CC simultaneously, such that only the 1-bit per subframe is required for HARQ feedback, a combination of spatial bundling and CC bundling for 2-bit feedback, and the like.

Figure 4B:
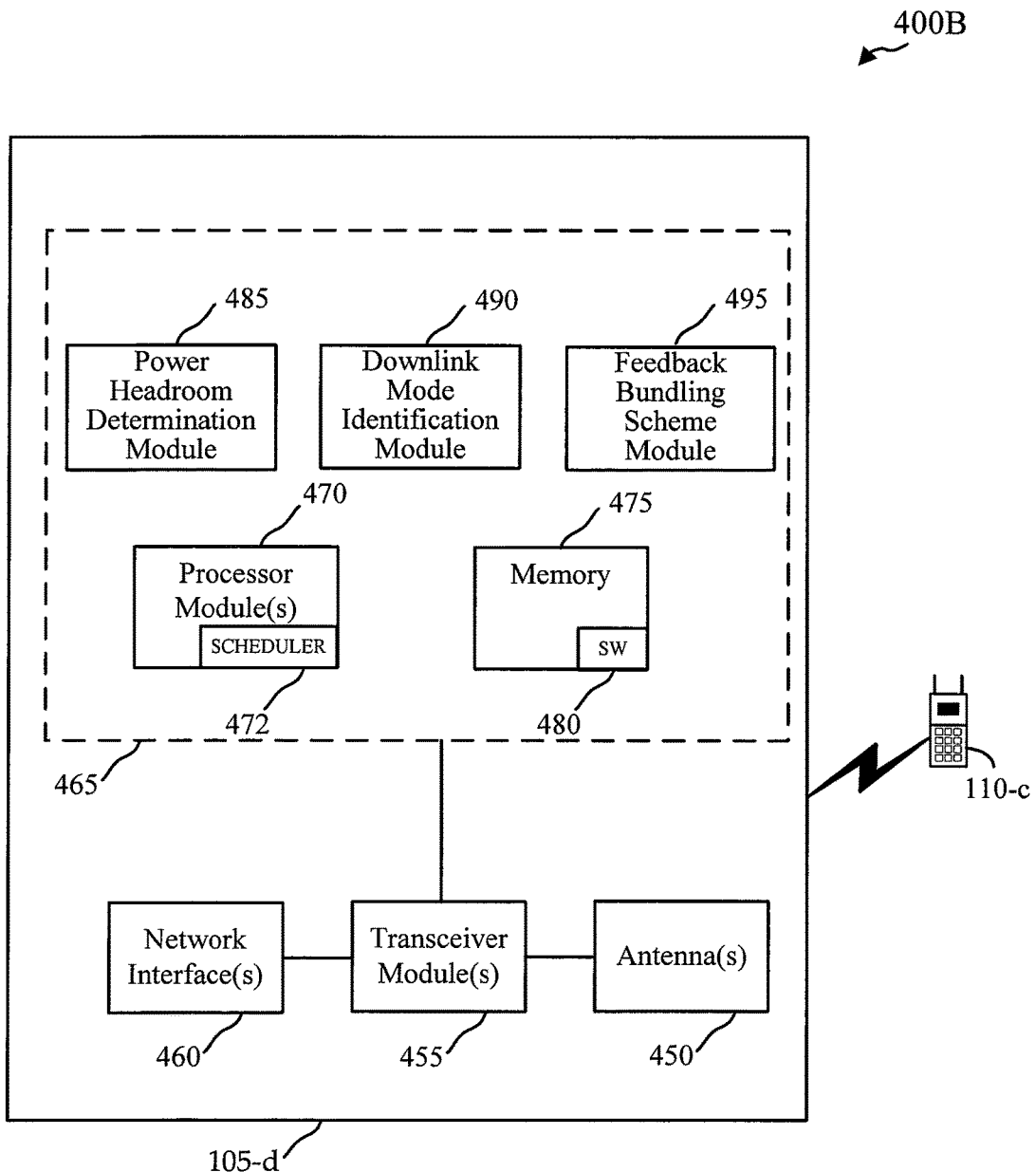
FIG. 4B is a block diagram of a base station that facilitates bundling feedback values for multiple CCs.

With reference now to FIG. 4B, an example wireless communication system 400B that bundles feedback for multiple component carriers is depicted. System 400B includes a base station 105-*d* and mobile device 110-*c* that may communicate with base station 105-*d* to receive access to a wireless network, as described. In addition, device 110-*c* may be power-limited at least over one uplink component carrier such that base station 105-*d* may experience degraded communication quality from mobile device 110-*c*. For example, the power-limitation can be caused by poor radio conditions, decrease in power consumption by mobile device 110-*c* (e.g., as directed by base station 105-*d* or otherwise), etc. Also, base station 105-*d* may determine that mobile device 110-*c* is power-limited based at least in part on power headroom reports relating to one or more configured component carriers. Mobile device 110-*c* may send power headroom reports to base station 105-*d* periodically or upon request.

Base station 105-*d* includes one or more antennas 450, similarly as described above, communicatively coupled to transceiver module(s) 455. Network interfaces 460 may provide an interface to one or more networks associated with the wireless communications system 400B. Base station 105-*d* includes a control module 465 that contains a power headroom determination module 485, a downlink mode identification module 490, a feedback bundling scheme module 495, one or more processor module(s) 470, a scheduler 472, a memory 475, and software 480. The scheduler 472 may be included in the one or more processor module(s) 470, and may schedule the mobile device on a subset of configured carriers under the influence of processor module(s) 470 and/or feedback bundling scheme module 495. The components of the control module 465 may, individually or collectively, be implemented with one or more Application Specific Integrated Circuits (ASICs) adapted to perform some or all of the applicable functions in hardware. Each of the noted modules may be a means for performing one or more functions related to operation of the base station 105-*c*.

Power headroom determination module 485 may determine that the mobile device 110-*c* is power limited, and provide this information to downlink mode identification module 490 and/or feedback bundling scheme module 495. Downlink mode identification module 490 may operate to identify downlink transmission modes for communications with the mobile device 110-*c* on its configured CCs. Feedback bundling scheme module 495 may operate to identify a feedback bundling scheme based on the downlink transmission mode similarly as described above. The base station 105-*d* is, thus, able to communicate with mobile device 110-*c* according to the identified downlink transmission mode and feedback bundling scheme.

In addition, feedback bundling scheme module 495 may also indicate one or more parameters regarding HARQ-ACK repetition, as described above. Moreover, for example, feedback bundling scheme module 495 may indicate whether to bundle CC feedback for a subset of CCs, configured CCs, scheduled CCs, and/or the like, as described above. In this regard, for example, feedback bundling scheme module 495 may communicate the one or more feedback format parameters to the mobile device 110-*c*, and mobile device 110-*c* may bundle (and/or repeat) feedback according to the one or more parameters, as described above, to reduce feedback overhead (and/or improve reliability of the feedback transmissions). Processing module 470 may obtain feedback for multiple CCs from mobile device 110-*c* bundled in feedback a format designed for a single component carrier, as described, and can utilize the bundled feedback to determine whether communications need to be retransmitted over the multiple CCs.

Moreover, in an example, downlink mode identification module 490 may determine downlink transmission modes for mobile device 110-*c* based at least in part on power-limitation to decrease feedback resources required of mobile device 110-*c*. Thus, for example, downlink mode identification module 490 can determine a single-input multiple-output (SIMO) transmission mode for mobile device 110-*c* (e.g., for each CC) based at least in part on the power-limitation. The SIMO mode restriction can be explicitly specified or implicitly enforced such that a MIMO mode configuration is treated as an error case, for example. In this regard, feedback for the CCs can be restricted to 1-bit per subframe, and thus bundled feedback for the CCs can also be 1-bit per subframe. Another example is to enforce both bundling feedback across CCs and bundling across multiple codewords within a CC simultaneously, such that only the 1-bit per subframe is required for HARQ feedback.

The processor module 470 may include an intelligent hardware device, e.g., a central processing unit (CPU) such as those made by Intel® Corporation or AMD®, a microcontroller, an application specific integrated circuit (ASIC), etc. The memory 475 may include random access memory (RAM) and read-only memory (ROM). The memory 475 may store computer-readable, computer-executable software code 480 containing instructions that are configured to, when executed (or when compiled and executed), cause the processor module 475 to perform various functions described herein (e.g., feedback bundling scheme identification, downlink transmission mode identification, etc.).

Figure 5:
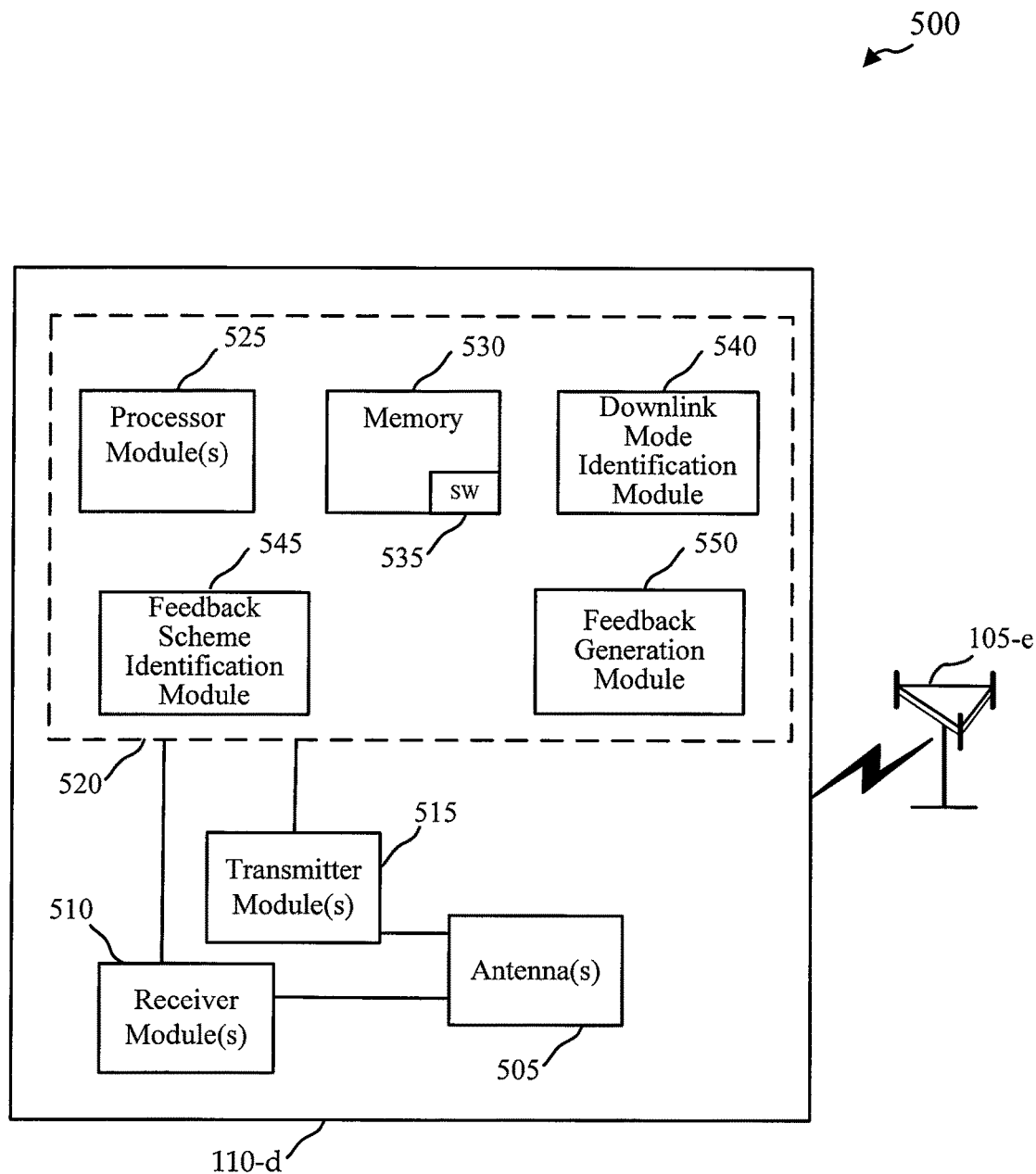
FIG. 5 is a block diagram of a mobile device that facilitates bundling feedback values for multiple CCs.

Referring now to FIG. 5, an example wireless communication system 500 that bundles feedback for multiple component carriers is depicted. System 500 includes a base station 105-*e* and mobile device 110-*d* that can communicate with base station 105-*d* to receive access to a wireless network, as described. In addition, device 110-*d* may be power-limited at least over one uplink component carrier. Mobile device 110-*d* includes one or more antenna(s) 505 communicatively coupled to receiver module(s) 510 and transmitter module(s) 515, which are, in turn, communicatively coupled to a control module 520. Control module 520 includes one or more processor module(s) 525, a memory 530 that contains software 535 for execution by processor module 525, a downlink mode identification module 540, a feedback scheme identification module 545, and a feedback generation module 550.

The processor module 525 may include an intelligent hardware device, e.g., a central processing unit (CPU) such as those made by Intel® Corporation or AMD®, a microcontroller, an application specific integrated circuit (ASIC), etc. The memory 530 may include random access memory (RAM) and read-only memory (ROM). The memory 530 may store computer-readable, computer-executable software code 535 containing instructions that are configured to, when executed (or when compiled and executed), cause the processor module 525 to perform various functions described herein (e.g., feedback bundling scheme identification, downlink transmission mode identification, etc.).

The transmitter module(s) 515 can transmit to base station 105-*d* (and/or other base stations) over one or more uplink CCs, as described above. The receiver module(s) 520 can receive downlink transmissions from base station 105-*d* (and/or other base stations) over two or more downlink CCs, as described above. Downlink transmissions are received and processed according to the particular transmission mode identified by downlink mode identification module 540.

Downlink mode identification module 540 may also provide information to feedback scheme identification module 545 for use in identifying a feedback bundling scheme as described above. Feedback generation module 550 can initialize one or more feedback values for communications received (or not received) over the plurality of downlink CCs and bundle the feedback into a feedback scheme as identified by feedback scheme identification module 545. In some aspects, a size or bitwidth of the feedback format used for carrying the one or more feedback values may correspond to a size or bitwidth used for feedback relating to a single component carrier. Feedback generation module 550 can also optionally comprise a feedback repetition component that can repeat feedback transmissions over one or more subframes, and/or a CC selecting component that can determine a subset of CCs for which to transmit feedback.

According to an example, receiver module(s) 510 can receive communications from base station 105-*e* over a plurality of downlink CCs, as described. It is to be appreciated that base station 105-*e* can assign the downlink (and/or uplink) CCs to mobile device 110-*d* (e.g., based at least in part on data rate requirements of the mobile device 110-*d*, available resources, and/or the like). As described, feedback generation module 550 can determine feedback values related to communications received over the downlink CCs. For example, the feedback can relate to HARQ feedback, such as ACK or NACK related to communications received in a subframe, one or more codewords related to signals transmitted in the subframe, etc.

In addition, feedback generation module 550 can combine the feedback of the downlink CCs into feedback format as identified by feedback scheme identification module 545. In an example, feedback generation module 550 can combine feedback for a given subframe, portion thereof, codeword, and/or the like. In one example, where feedback scheme identification module 545 may identify a feedback scheme that combines feedback related to the downlink CCs for each codeword among multiple codewords in a subframe, and that also performs spatial bundling across the multiple codewords so that one feedback value can be generated for substantially all codewords over substantially all downlink CCs related to mobile device 110-*d* in a subframe. In any case, feedback generation module 550 can generate the bundled feedback value(s) from transmission to base station 105-*e* over an uplink CC.

In one example, feedback scheme identification module 545 identifies the feedback scheme based at least in part on one or more parameters received from base station 105-*e* (e.g., as a result of base station 105-*e* determining that transmissions from mobile device 110-*d* are power-limited). Feedback scheme identification module 545 may also cancel other signals to be transmitted over the uplink CC, such as channel quality indicator (CQI)/channel state information (CSI) channel feedback, data signals, etc., to ensure feedback is transmitted. In another example, signals can be transmitted by according to channel condition and prioritization of uplink power on same or different CCs. Thus, when using feedback bundling, not all feedback may be transmitted.

Figure 6:
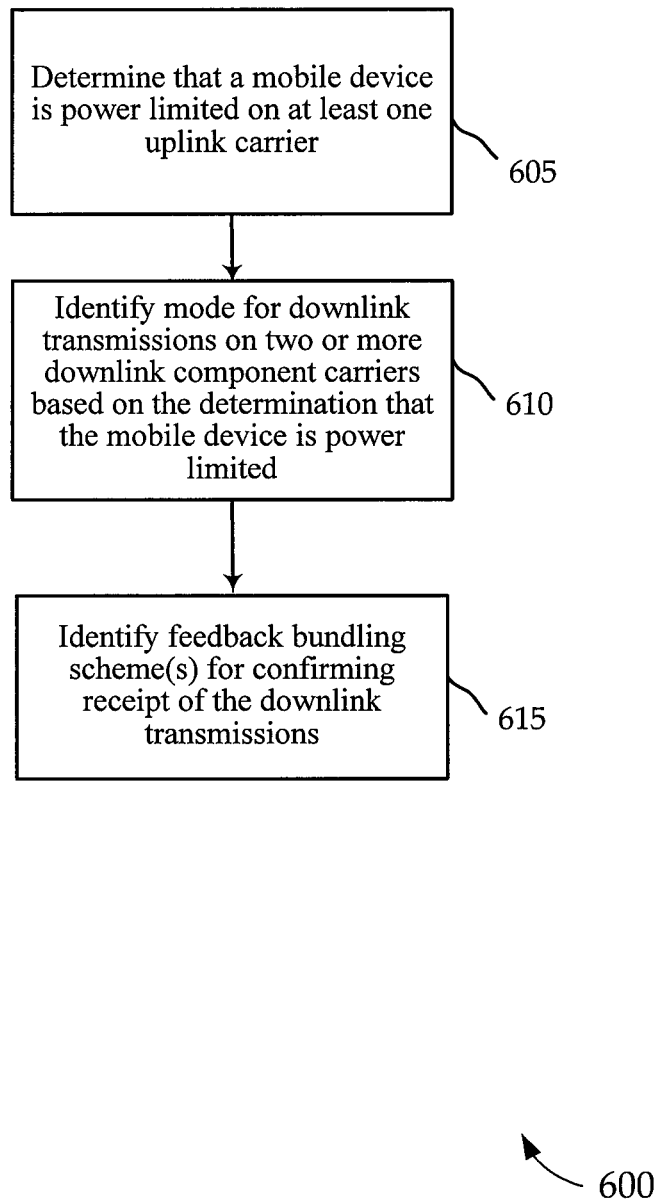
FIG. 6 is a flowchart of a method for bundling feedback for multiple CCs.

Turning to FIG. 6, a flowchart of the operational steps 600 for feedback bundling according to an example is described. The method 600 may, for example, be performed by the base station of FIG. 1, 2, 3, 4, or 5, or using any combination of the devices described for these figures. In this example, it is initially determined that a mobile device is power limited on at least one uplink carrier, as indicated at block 605. Such a determination may be made using power headroom provided from the mobile device, for example. The determination that the mobile device is power limited may also be based on the long-term channel condition report (e.g., reference signal received power (RSRP)). Alternatively or additionally, the base station can estimate power for the device. The base station may compare the estimated and/or reported power to a threshold value in order to determine whether the device is power-limited. At block 610, a mode is identified for downlink transmissions on two or more downlink component carriers based on the determination that the mobile device is power limited. The downlink transmit mode may be identified, as described above, based on capability for feedback payload reduction through feedback bundling, such as a transmit mode that uses only a single codeword for purposes of HARQ feedback, for example. At block 615, one or more feedback bundling scheme(s) is identified for confirming receipt of the downlink transmissions. As discussed above, the bundling scheme identified for the mobile device may be based, in part, on one or more transmission modes of the downlink CCs. Bundling schemes may include combinations of bundling techniques and an order in which these techniques are applied. In particular, the bundling techniques may include CC bundling in combination with spatial bundling and/or feedback repetition. For efficiency and performance, a bundling scheme may require application of CC bundling before resorting to use of feedback repetition.

Figure 7:
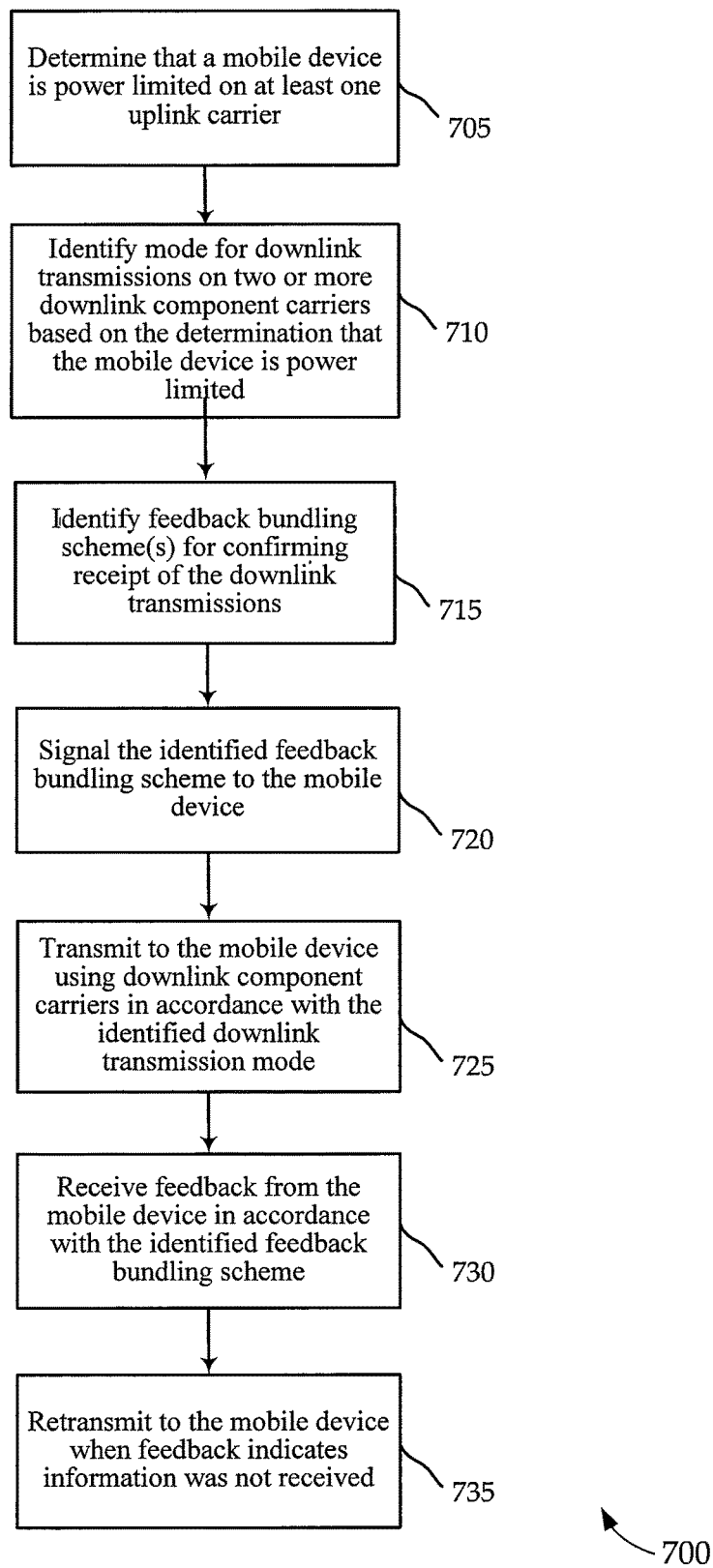
FIG. 7 is a flowchart of another method for bundling feedback for multiple CCs.

With reference now to FIG. 7, a flowchart of the operational steps 700 for feedback bundling according to another example is described. The method 700 may, for example, be performed by the base station of FIG. 1, 2, 3, 4 or 5, or using any combination of the devices described for these figures. In this example, it is initially determined that a mobile device is power limited on at least one uplink carrier, as indicated at block 705. Such a determination may be made according to any suitable method, such as any of the methods described herein. A mode is identified for downlink transmissions on two or more downlink component carriers based on the determination that the mobile device is power limited, according to block 710. The downlink transmit mode may be identified according to any suitable method, such as any of the methods described herein. At block 715, one or more feedback bundling scheme(s) is identified for confirming receipt of the downlink transmissions. As discussed above, the bundling scheme identified for the mobile device may be based, in part, on one or more transmission modes of the downlink CCs, and may include combinations of bundling techniques and an order in which these techniques are applied.

The identified feedback bundling scheme is signaled to the mobile device at block 720. Such signaling may be accomplished through typical control channel communications, for example. Downlink transmissions to the mobile device using downlink component carriers in accordance with the identified downlink transmission mode are made, as indicated at block 725. At block 730, feedback is received from the mobile device in accordance with the identified feedback bundling scheme. Downlink transmission(s) are retransmitted to the mobile device when feedback indicates information was not received, as indicated at block 735. For example, if the mobile device transmits a NACK back to the base station, the downlink transmission that was the subject of the NACK indication is retransmitted over one or more of the downlink CCs to the mobile device.

Figure 8:
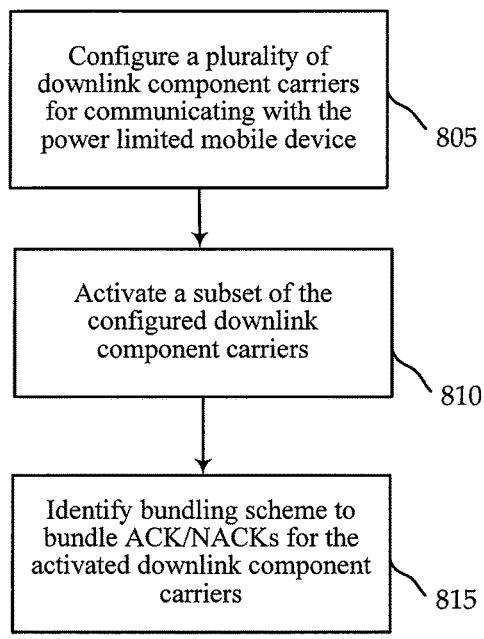
FIG. 8 is a flowchart of a method for bundling feedback for multiple activated CCs.

Referring now to FIG. 8, a flowchart of the operational steps 800 for feedback bundling on only activated downlink CCs according to an example is described. The method 800 may, for example, be performed by the base station of FIG. 1, 2, 3, 4 or 5, or using any combination of the devices described for these figures. In this example, a plurality of downlink component carriers for communicating with the power limited mobile device are configured, at noted at block 805. A subset of the configured downlink component carriers are activated, according to block 810. Finally, at block 815, a scheme for bundling ACK/NACKs for the activated downlink component carriers ACK/NACK is identified. The bundling scheme used may be determined based on any suitable technique, such as those described herein, with further information related to the activated CCs over which bundling is to be performed. The bundling scheme and activated carriers may be provided to a mobile device, with feedback performed according to the bundling scheme on the activated downlink channels.

Figure 9:
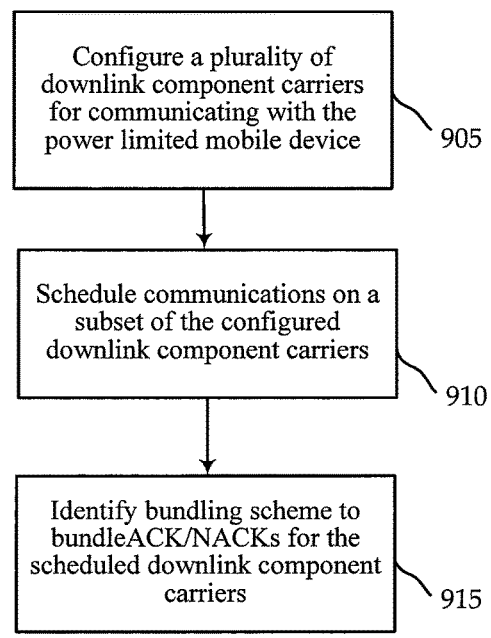
FIG. 9 is a flowchart of a method for bundling feedback for multiple scheduled CCs.

With reference to FIG. 9, a flowchart of the operational steps 900 for feedback bundling on only scheduled downlink CCs according to an example is described. The method 900 may, for example, be performed by the base station of FIG. 1, 2, 3, 4 or 5, or using any combination of the devices described for these figures. In this example, a plurality of downlink component carriers for communicating with the power limited mobile device are configured, at noted at block 905. A subset of the configured downlink component carriers are scheduled for communications, according to block 810. That is, for particular downlink transmissions, it is determined that only a subset of the downlink CCs will be used for the downlink transmissions. Finally, at block 915, a scheme for bundling ACK/NACKs for the scheduled downlink component carriers ACK/NACK is identified. The bundling scheme used may be determined based on any suitable technique, such as those described herein. Information related to the scheduled CCs over which bundling is to be performed may be provided by the base station according to a downlink assignment index (DAI), with this information communicated to the mobile device prior to the downlink transmissions. The information communicated to the mobile device may simply be a bitmap, for example, with a single bit for each activated component carrier and the state of each bit indicating that the corresponding CC will include downlink communications or not. The bundling scheme and scheduled carriers may be provided to a mobile device, with feedback performed according to the bundling scheme on the scheduled downlink channels.

Figure 10:
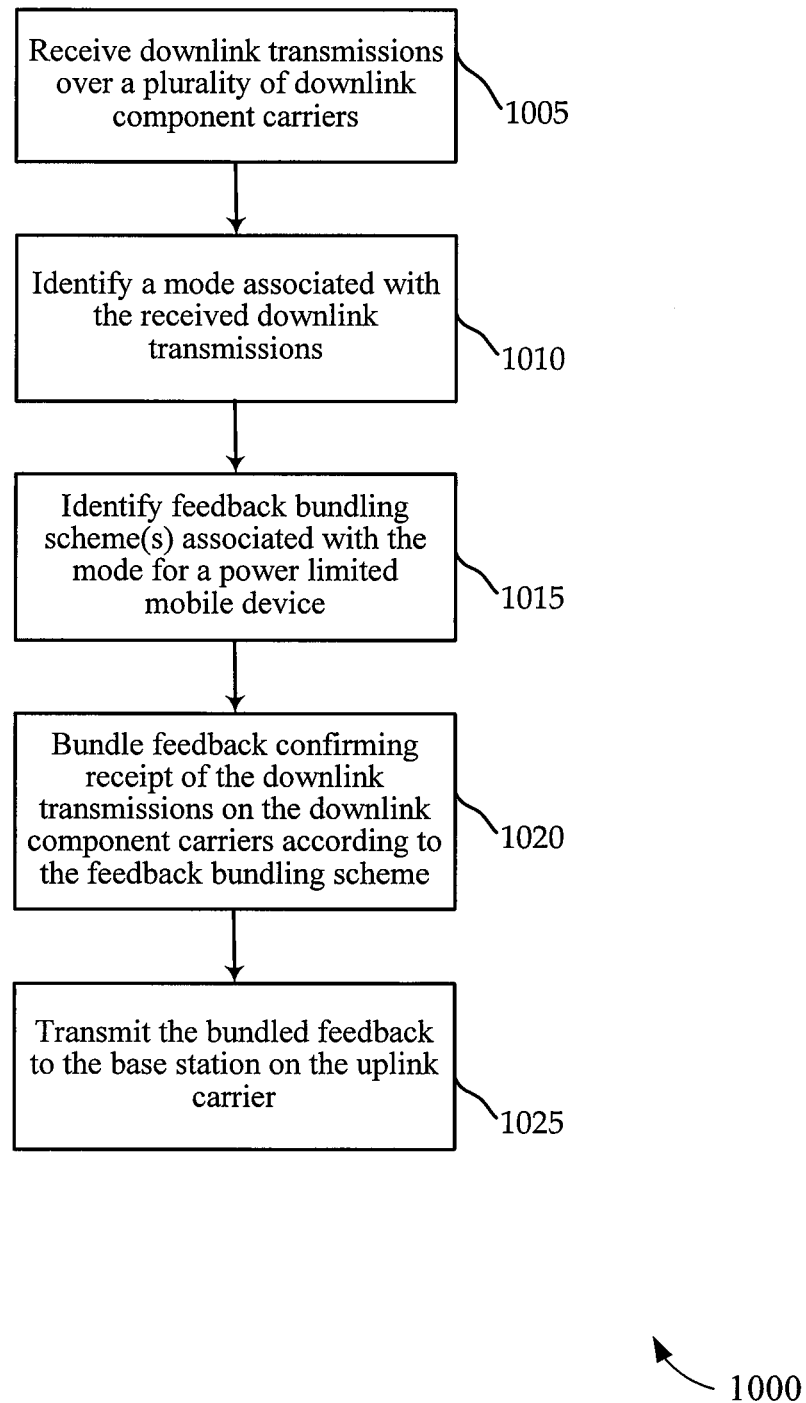
FIG. 10 is a flowchart of a method for bundling and transmitting bundled feedback for multiple CCs.

Referring now to FIG. 10, a flowchart of the operational steps 1000 for feedback bundling according to an example is described. The method 1000 may, for example, be performed by the mobile device of FIG. 1, 2, 3, 4 or 5, or using any combination of the devices described for these figures. In this example, downlink transmissions are received over a plurality of downlink component carriers, as indicated at block 1005. A mode is identified for the received downlink transmissions, at block 1010. The identified mode is a particular downlink transmission mode, such as one of the downlink transmission modes described above. One or more feedback bundling scheme(s) is identified as associated with the mode for a power limited mobile device, according to block 1015. The feedback bundling scheme(s) may be one or more of the schemes as described above. At block 1020, feedback is bundled for confirming receipt of the downlink transmissions on the downlink component carriers according to the feedback bundling scheme. Finally, at block 1025, the bundled feedback is transmitted to the base station on the uplink carrier.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

The detailed description set forth above in connection with the appended drawings describes examples and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, DSL are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the description is not to be limited to the examples and designs described herein, but is to be accorded the widest scope consistent with the principles and novel features disclosed herein.

What is claimed is:

1. A method of wireless communication, comprising:
   determining, by a base station, that a mobile device is power limited on at least one uplink carrier;
   identifying, by the base station, downlink transmission modes on two or more downlink component carriers based on the determination that the mobile device is power limited;
   identifying, by the base station, at least one feedback bundling scheme from a plurality of feedback bundling schemes on the at least one uplink carrier for confirming receipt of the downlink transmissions on the two or more downlink component carriers; and
   receiving, by the base station, feedback from the mobile device in accordance with the at least one feedback bundling scheme.

2. The method of claim 1, further comprising:
   signaling the at least one feedback bundling scheme to the mobile device.

3. The method of claim 1, further comprising:
   determining receipt of information transmitted by the mobile device based on the received feedback; and
   retransmitting at least a portion of the information based on the determined receipt of the information.

4. The method of claim 1, wherein the at least one feedback bundling scheme comprises a scheme for bundling acknowledgment/negative acknowledgments (ACK/NACKs) for each of the two or more downlink component carriers into a single ACK/NACK.

5. The method of claim 1, wherein the at least one feedback bundling scheme comprises a scheme for bundling acknowledgment/negative acknowledgments (ACK/NACKs) for a plurality of codewords within a single downlink component carrier into a single ACK/NACK.

6. The method of claim 1, wherein the at least one feedback bundling scheme comprises a scheme for bundling acknowledgment/negative acknowledgments (ACK/NACKs) across the two or more downlink component carriers, and bundling ACK/NACKs from two codewords for at least one other downlink component carrier into a single ACK/NACK.

7. The method of claim 1, wherein the at least one feedback bundling scheme comprises a scheme for bundling acknowledgment/negative acknowledgments (ACK/NACKs) for two or more subframes in a time division duplex (TDD) component carrier into a single ACK/NACK.

8. The method of claim 1, wherein the at least one feedback bundling scheme comprises:
   a first sub-scheme comprising bundling acknowledgment/negative acknowledgments (ACK/NACKs) across the two or more downlink component carriers; and
   a second sub-scheme comprising performing repetition of ACK/NACKs, wherein the second sub-scheme is utilized in connection with the first sub-scheme.

9. The method of claim 1, wherein the determining that a mobile device is power limited on an uplink carrier is based on a power headroom report received from the mobile device.

10. The method of claim 1, further comprising:
    configuring the mobile device to cancel transmission of one or more signals in connection with the at least one feedback bundling scheme.

11. The method of claim 10, wherein the configuring comprises:
    configuring the mobile device to cancel transmission of Channel State Information (CSI) feedback.

12. The method of claim 1, wherein the identifying downlink transmission modes comprises:
    selecting a single codeword transmit mode for the two or more downlink component carriers.

13. The method of claim 1, further comprising:
    configuring a plurality of downlink component carriers for communicating with the mobile device; and
    scheduling communications on a subset of the configured plurality of downlink component carriers,
    wherein the at least one feedback bundling scheme comprises a scheme for bundling acknowledgment/negative acknowledgments (ACK/NACKs) for the subset of the configured plurality of downlink component carriers into a single ACK/NACK.

14. The method of claim 1, further comprising:
    configuring a plurality of downlink component carriers for communicating with the mobile device; and activating a subset of the configured plurality of downlink component carriers,
wherein the at least one feedback bundling scheme comprises a scheme for bundling acknowledgment/negative acknowledgments (ACK/NACKs) for the activated subset of the configured plurality of downlink component carriers into a single ACK/NACK.

15. The method of claim 14, further comprising:
scheduling communications on the activated subset of the configured plurality of downlink component carriers, wherein the at least one feedback bundling scheme comprises a scheme for bundling acknowledgment/negative acknowledgments (ACK/NACKs) for the subset of the configured plurality of downlink component carriers into a single ACK/NACK.

16. The method of claim 15, further comprising:
notifying the mobile device of the subset of the configured plurality of downlink component carriers.

17. The method of claim 1, further comprising:
identifying a first subset of the two or more downlink component carriers based on a frequency band of the component carriers; and
configuring the mobile device to bundle acknowledgment/negative acknowledgments (ACK/NACKs) for the first subset of the two or more downlink component carriers into a single ACK/NACK.

18. A wireless communication apparatus, comprising:
means for determining, by a base station, that a mobile device is power limited on at least one uplink carriers;
means for identifying, by the base station, downlink transmission modes on two or more downlink component carriers based on the determination that the mobile device is power limited;
means for identifying, by the base station, at least one feedback bundling scheme from a plurality of feedback bundling schemes on the at least one uplink carrier for confirming receipt of the downlink transmissions on the two or more downlink component carriers; and
means for receiving, by the base station, feedback from the mobile device in accordance with the at least one feedback bundling scheme.

19. The apparatus of claim 18, wherein the at least one feedback bundling scheme comprises a scheme for bundling acknowledgment/negative acknowledgments (ACK/NACKs) across the two or more downlink component carriers into a single ACK/NACK.

20. The apparatus of claim 18, wherein the at least one feedback bundling scheme comprises a scheme for bundling acknowledgment/negative acknowledgments (ACK/NACKs) from a plurality of codewords within a single downlink component carrier into a single ACK/NACK.

21. The apparatus of claim 18, wherein the at least one feedback bundling scheme comprises a scheme for bundling acknowledgment/negative acknowledgments (ACK/NACKs) across the two or more downlink component carriers, and bundling ACK/NACKs from two codewords for at least one other downlink component carrier into a single ACK/NACK.

22. The apparatus of claim 18, wherein the at least one feedback bundling scheme comprises:
a first sub-scheme comprising bundling acknowledgment/negative acknowledgments (ACK/NACKs) across the two or more downlink component carriers; and
a second sub-scheme comprising performing repetition of ACK/NACKs,
wherein the second sub-scheme is utilized in connection with the first sub-scheme.

23. The apparatus of claim 18, further comprising:
means for configuring a plurality of downlink component carriers for communicating with the mobile device; and
means for scheduling communications on a subset of the configured plurality of downlink component carriers,
wherein the at least one feedback bundling scheme comprises a scheme for bundling acknowledgment/negative acknowledgments (ACK/NACKs) across the subset of the configured plurality of downlink component carriers into a single ACK/NACK.

24. A base station, comprising:
a power headroom determination module of the base station configured to determine that a mobile device is power limited on at least one uplink carrier;
a downlink mode identification module of the base station, in communication with the power headroom determination module, and configured to identify downlink transmission modes on two or more downlink component carriers based on the determination that the mobile device is power limited;
a feedback bundling scheme module of the base station, in communication with the downlink mode identification module, and configured to identify at least one feedback bundling scheme from a plurality of feedback bundling schemes on the at least one uplink carrier for confirming receipt of the downlink transmissions on the two or more downlink component carriers; and
a receiver of the base station to receive feedback from the mobile device in accordance with the at least one feedback bundling scheme.

25. The base station of claim 24, wherein the at least one feedback bundling scheme comprises a scheme for bundling acknowledgment/negative acknowledgments (ACK/NACKs) across the two or more downlink component carriers into a single ACK/NACK.

26. The base station of claim 24, wherein the at least one feedback bundling scheme comprises a scheme for bundling acknowledgment/negative acknowledgments (ACK/NACKs) from a plurality of codewords within a single downlink component carrier into a single ACK/NACK.

27. The base station of claim 24, wherein the at least one feedback bundling scheme comprises a scheme for bundling acknowledgment/negative acknowledgments (ACK/NACKs) across the two or more downlink component carriers, and bundling ACK/NACKs from two codewords for at least one other downlink component carrier into a single ACK/NACK.

28. The base station of claim 24, wherein the at least one feedback bundling scheme comprises:
a first sub-scheme comprising bundling acknowledgment/negative acknowledgments (ACK/NACKs) across the two or more downlink component carriers; and
a second sub-scheme comprising performing repetition of ACK/NACKs,
wherein the second sub-scheme is utilized in connection with the first sub-scheme.

29. The base station of claim 24, wherein the downlink mode identification module is further configured to:
configure a plurality of downlink component carriers for communicating with the mobile device; and
schedule communications on a subset of the configured plurality of downlink component carriers, wherein the at least one feedback bundling scheme comprises a scheme for bundling acknowledgment/negative acknowledgments (ACK/NACKs) for the subset of the configured plurality of downlink component carriers into a single ACK/NACK.

30. The base station of claim 24, wherein the base station comprises a processor.

31. A non-transitory computer readable medium storing program code executable on a processor, the program code comprising:
   code for determining, by a base station, that a mobile device is power limited on at least one uplink carrier;
   code for identifying, by the base station, downlink transmission modes on two or more downlink component carriers based on the determination that the mobile device is power limited;
   code for identifying, by the base station, at least one feedback bundling scheme from a plurality of feedback bundling schemes on the at least one uplink carrier for confirming receipt of the downlink transmissions on the two or more downlink component carriers; and
   code for receiving feedback, by the base station, from the mobile device in accordance with the at least one feedback bundling scheme.

32. The non-transitory computer readable medium of claim 31, wherein the at least one feedback bundling scheme comprises a scheme for bundling acknowledgment/negative acknowledgments (ACK/NACKs) across the two or more downlink component carriers into a single ACK/NACK.

33. The non-transitory computer readable medium of claim 31, wherein the at least one feedback bundling scheme comprises a scheme for bundling acknowledgment/negative acknowledgments (ACK/NACKs) across a plurality of codewords within a single downlink component carrier into a single ACK/NACK.

34. The non-transitory computer readable medium of claim 31, wherein the at least one feedback bundling scheme comprises a scheme for bundling acknowledgment/negative acknowledgments (ACK/NACKs) for the two or more downlink component carriers, and bundling ACK/NACKs from two codewords for at least one other downlink component carrier into a single ACK/NACK.

35. The non-transitory computer readable medium of claim 31, wherein the at least one feedback bundling scheme comprises:
   a first sub-scheme comprising bundling acknowledgment/negative acknowledgments (ACK/NACKs) across the two or more downlink component carriers; and
   a second sub-scheme comprising performing repetition of ACK/NACKs,
   wherein the second sub-scheme is utilized in connection with the first sub-scheme.

36. The non-transitory computer readable medium of claim 31, wherein the program code further comprises:
   code for configuring a plurality of downlink component carriers for communicating with the mobile device; and
   code for scheduling communications on a subset of the configured plurality of downlink component carriers,
   wherein the at least one feedback bundling scheme comprises a scheme for bundling acknowledgment/negative acknowledgments (ACK/NACKs) for the subset of the configured plurality of downlink component carriers into a single ACK/NACK.

37. A user equipment (UE), comprising:
   a receiver, of the UE, configured to receive a plurality of downlink transmissions over a plurality of component carriers from a base station;
   a downlink mode identification module, of the UE, configured to identify downlink transmission modes associated with the plurality of component carriers;
   a feedback scheme identification module, of the UE, configured to identify at least one feedback bundling scheme from a plurality of feedback bundling schemes for acknowledging receipt of downlink transmissions on the plurality of component carriers, the at least one feedback bundling scheme based at least in part on a power limited condition of the UE;
   a feedback generation module, of the UE, configured to bundle feedback confirming receipt of the downlink transmissions on the plurality of component carriers according to the at least one feedback bundling scheme; and
   a transmitter, of the UE, configured to transmit the bundled feedback to the base station on an uplink carrier.

38. The UE of claim 37, wherein the at least one feedback bundling scheme comprises a scheme for bundling acknowledgment/negative acknowledgments (ACK/NACKs) across the plurality of component carriers into a single ACK/NACK.

39. The UE of claim 37, wherein the at least one feedback bundling scheme comprises a scheme for bundling acknowledgment/negative acknowledgments (ACK/NACKs) from a plurality of codewords within a single component carrier into a single ACK/NACK.

40. The UE of claim 37, wherein the at least one feedback bundling scheme comprises a scheme for bundling acknowledgment/negative acknowledgments (ACK/NACKs) across the plurality of component carriers, and further bundling ACK/NACKs from two codewords for at least one other component carrier into a single ACK/NACK.

41. The UE of claim 37, wherein the at least one feedback bundling scheme comprises:
   a first sub-scheme comprising bundling acknowledgment/negative acknowledgments (ACK/NACKs) across the plurality of component carriers; and
   a second sub-scheme comprising performing repetition of ACK/NACKs,
   wherein the second sub-scheme is utilized in connection with the first sub-scheme.

42. A method of wireless communication from a mobile device, the method comprising:
   receiving, at a mobile device, downlink transmissions over a plurality of downlink component carriers from a base station;
   identifying, by the mobile device, transmission modes associated with the received downlink transmissions;
   identifying, by the mobile device, at least one feedback bundling scheme from a plurality of feedback bundling schemes on at least one uplink carrier for confirming receipt of the downlink transmissions, the at least one feedback bundling scheme associated with a power limited condition of the mobile device;
   bundling feedback, by the mobile device, confirming receipt of the downlink transmissions on the downlink component carriers according to the at least one feedback bundling scheme; and
   transmitting, by the mobile device, the bundled feedback to the base station on the at least one uplink carrier.

43. The method of claim 42, further comprising:
   providing transmit power information to a base station over at least one uplink carrier.

44. The method of claim 42, wherein the at least one feedback bundling scheme comprises a scheme for bundling acknowledgment/negative acknowledgments (ACK/NACKs) across the plurality of downlink component carriers into a single ACK/NACK.

45. The method of claim 42, wherein the at least one feedback bundling scheme comprises a scheme for bundling acknowledgment/negative acknowledgments (ACK/NACKs) from a plurality of codewords within a single component carrier into a single ACK/NACK.

46. The method of claim 42, wherein the at least one feedback bundling scheme comprises:
  a first sub-scheme comprising bundling acknowledgment/negative acknowledgments (ACK/NACKs) across the plurality of downlink component carriers; and
  a second sub-scheme comprising performing repetition of ACK/NACKs,
  wherein the second sub-scheme is utilized in connection with the first sub-scheme.

\* \* \* \* \*